(12) United States Patent
Washizu et al.

(10) Patent No.: US 10,814,481 B2
(45) Date of Patent: Oct. 27, 2020

(54) ROBOT SYSTEM FOR PERFORMING LEARNING CONTROL BY USING MOTOR ENCODER AND SENSOR

(71) Applicant: Fanuc Corporation, Yamanashi (JP)

(72) Inventors: Shinichi Washizu, Yamanashi (JP); Hajime Suzuki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 71 days.

(21) Appl. No.: 16/372,700

(22) Filed: Apr. 2, 2019

(65) Prior Publication Data

US 2019/0308316 A1   Oct. 10, 2019

(30) Foreign Application Priority Data

Apr. 6, 2018 (JP) .................................. 2018-074022

(51) Int. Cl.
*B25J 9/16* (2006.01)
*B25J 13/08* (2006.01)

(52) U.S. Cl.
CPC .............. *B25J 9/163* (2013.01); *B25J 9/1664* (2013.01); *B25J 13/089* (2013.01)

(58) Field of Classification Search
CPC ......... B25J 9/163; B25J 9/1664; B25J 13/089
See application file for complete search history.

(56) References Cited

U.S. PATENT DOCUMENTS

| | | | | |
|---|---|---|---|---|
| 6,034,498 A * | 3/2000 | Hamamura | .......... | G05B 19/404 318/632 |
| 6,736,018 B2 * | 5/2004 | Terada | ...................... | H02P 5/00 73/862.27 |
| 7,039,498 B2 * | 5/2006 | Bacchi | ................... | B25J 9/1692 414/744.3 |
| 8,369,993 B2 * | 2/2013 | Kagawa | ................ | B25J 9/1692 700/263 |
| 8,396,697 B2 * | 3/2013 | Yang | .................... | G05B 19/404 703/2 |
| 8,428,779 B2 * | 4/2013 | Ohga | ..................... | B25J 9/1633 700/253 |
| 8,798,790 B2 * | 8/2014 | Kamiya | ............... | G05B 19/401 700/245 |
| 2006/0082340 A1 | 4/2006 | Watanabe et al. | | |
| 2007/0288124 A1 | 12/2007 | Nagata et al. | | |
| 2011/0234147 A1 * | 9/2011 | Iwashita | ................ | B23Q 15/08 318/799 |

FOREIGN PATENT DOCUMENTS

| | | |
|---|---|---|
| JP | 2006110702 A | 4/2006 |
| JP | 2011-167817 A | 9/2011 |
| JP | 2012240142 A | 12/2012 |
| JP | 2013041478 A | 2/2013 |
| WO | 2006022201 A1 | 5/2008 |

* cited by examiner

*Primary Examiner* — Nicholas Kiswanto
(74) *Attorney, Agent, or Firm* — RatnerPrestia

(57) ABSTRACT

A robot system includes a robot mechanism unit provided with a sensor and a motor encoder for detecting a position of a control target, and a robot control device which controls an operation of the robot mechanism unit in accordance with an operation program, in which a learning control unit includes a position error estimating section which estimates low-frequency components in a position error, based on information from the motor encoder and estimates high-frequency components in the position error, based on information from the sensor.

13 Claims, 8 Drawing Sheets

ROBOT SYSTEM FOR PERFORMING LEARNING CONTROL BY USING MOTOR ENCODER AND SENSOR

CROSS-REFERENCE TO RELATED APPLICATIONS

This application is a new U.S. Patent Application that claims benefit of Japanese Patent Application No. 2018-074022, filed Apr. 6, 2018, the disclosure of this application is being incorporated herein by reference in its entirety for all purposes.

BACKGROUND OF THE INVENTION

1. Field of the Invention

The present invention relates to learning control of a robot system and relates particularly to a robot system for performing learning control by using a motor encoder and a sensor.

2. Description of the Related Art

Methods for performing learning control for vibrations in a robot tip by attaching a sensor to the robot tip and measuring vibrations during operations have been proposed. For example, in JP 2011-167817 A, a sensor is used to estimate a tracking error. As examples of such a sensor, a vision sensor, an acceleration sensor, a gyro sensor, an inertial sensor, a strain gauge, and the like are described.

SUMMARY OF THE INVENTION

The technique for performing learning control for vibrations in a robot tip by using such a sensor has the following problems.

(1) With a vision sensor, a position of a point of measurement is not able to be measured in an operation at a crowded place or an operation in which orientation changes, or the like in some cases due to an obstruction being located between a measuring instrument and the point of measurement or the vision sensor being hidden behind the measurement target itself.

(2) With an acceleration sensor, a gyro sensor, an inertial sensor, or a strain gauge, computation for estimating a position from data obtained by the sensor causes an estimation error about the position to be large in some cases.

(3) After completion of learning by using such a sensor, the sensor installed in a robot is detached from the robot and can then be used for learning by another robot. However, in a case of modifying teaching from the first robot and performing learning again, the sensor needs to be attached again, which requires more man-hours.

Problem (2) described above will be described in more detail. FIG. 10A is a graph illustrating a relationship between a position error between an estimated position based on a sensor and a target position, and time. FIG. 10B is a graph obtained by removing low-frequency components from the graph illustrated in FIG. 10A by using a high-pass filter. In a case of an acceleration sensor, computation is performed to estimate speed by integrating acceleration acquired from the sensor and estimate a position by further integrating the speed as well as estimate a position error by subtracting a target position from an estimated position based on the sensor. Hence, in a case where there is even a slight error in the acceleration acquired from the sensor, estimation errors with respect to speed and position are accumulated along with time, which causes the position error to be excessively large along with time as illustrated in FIG. 10A. Although such estimation errors are accumulated in terms of low-frequency components in the position error, the low-frequency components including estimation errors can be removed by using the high-pass filter as illustrated in FIG. 10B. However, low-frequency components in position errors not including estimation errors are also removed, and thus this prevents accurate learning control for vibrations in a robot tip.

In view of these, a technique for performing accurate learning control for vibrations in a control target is desired.

An aspect of the present disclosure provides a robot system including a robot mechanism unit provided with a sensor and a motor encoder for detecting a position of a control target, and a robot control device which controls an operation of the robot mechanism unit in accordance with an operation program, the robot system including: a learning control unit which causes the robot mechanism unit to operate in accordance with an operation command related to a target position of the control target to estimate a position error between an estimated position of the control target and the target position and perform learning by newly calculating a new correction amount, based on the estimated position error and a correction amount calculated previously to bring the estimated position of the control target closer to the target position; and a robot control unit which corrects the operation command by using the newly calculated correction amount, to control the operation of the robot mechanism unit, wherein the learning control unit includes a position error estimating section which estimates a low-frequency component in the position error, based on information from the motor encoder, and estimates a high-frequency component in the position error, based on information from the sensor.

DETAILED DESCRIPTION

Figure 1:
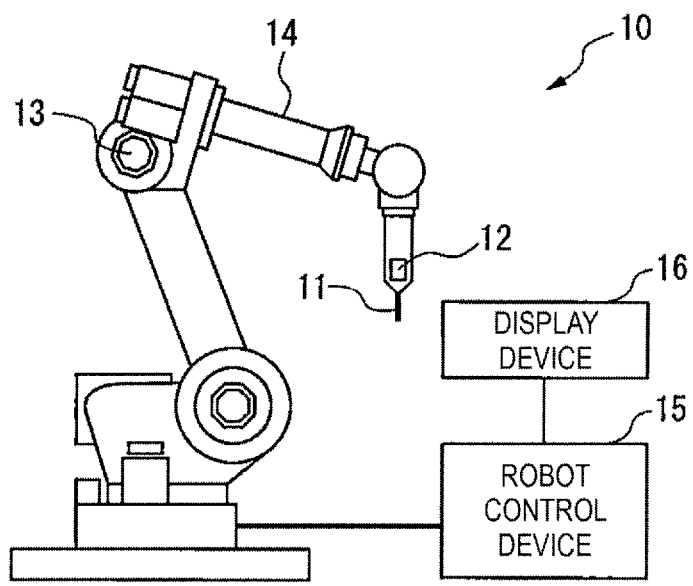
FIG. 1 is a schematic diagram of a robot system according to one embodiment.

Embodiments of the present disclosure will be described in detail below with reference to the accompanying drawings. In the drawings, identical or similar constituent elements are denoted by the same or similar reference numerals. Additionally, the embodiments described below are not intended to limit the technical scope of the invention or the meaning of terms set forth in the claims.

FIG. 1 is a schematic diagram of a robot system 10 according to a present embodiment. The robot system 10 includes: a robot mechanism unit 14 provided with a sensor 12 and a motor encoder 13 which detects a position of a control target 11, which is a target for position control; a robot control device 15 which controls the robot mechanism unit 14 in accordance with an operation program; and a display device 16 which displays various kinds of information, and performs learning control for vibrations in the control target 11. The sensor 12, the motor encoder 13, the robot mechanism unit 14, the robot control device 15, and the display device 16 are communicably connected to each other with wire or wirelessly.

The sensor 12 is a sensor which detects information (e.g., acceleration, angular speed, strain (electric resistance value), or the like) that requires computation, to estimate a position of the control target 11, and examples of the sensor 12 include an acceleration sensor, a gyro sensor, an inertial sensor, a strain gauge, and the like.

The motor encoder 13 is an encoder which detects a rotation amount, rotation speed, or the like of a servo motor provided to each of articulated shafts in the robot mechanism unit 14, and examples of the motor encoder 13 include an incremental encoder, an absolute encoder, and the like each of which includes a slit plate, and a light-emitting element and a light-receiving element arranged so as to sandwich the slit plate.

Figure 2:
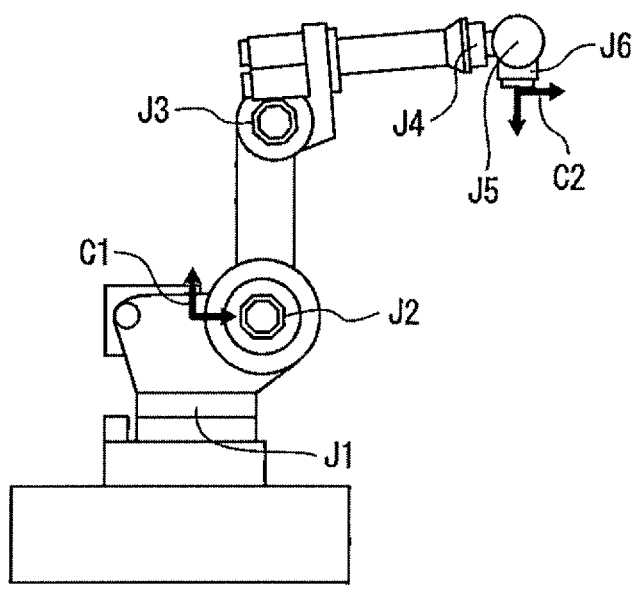
FIG. 2 is a schematic diagram of a robot mechanism unit according to the one embodiment.

FIG. 2 is a schematic diagram of the robot mechanism part 14 according to the present embodiment. The robot mechanism unit 14 includes six articulated shafts J1 to J6 each of which includes a servo motor, a reduction gear, and the like. The robot mechanism unit 14 is a robot manipulator in which a world coordinate system C1 fixed in a space and a mechanical interface coordinate system C2 located at a flange position of the articulated shaft J6 are defined.

Figure 3:
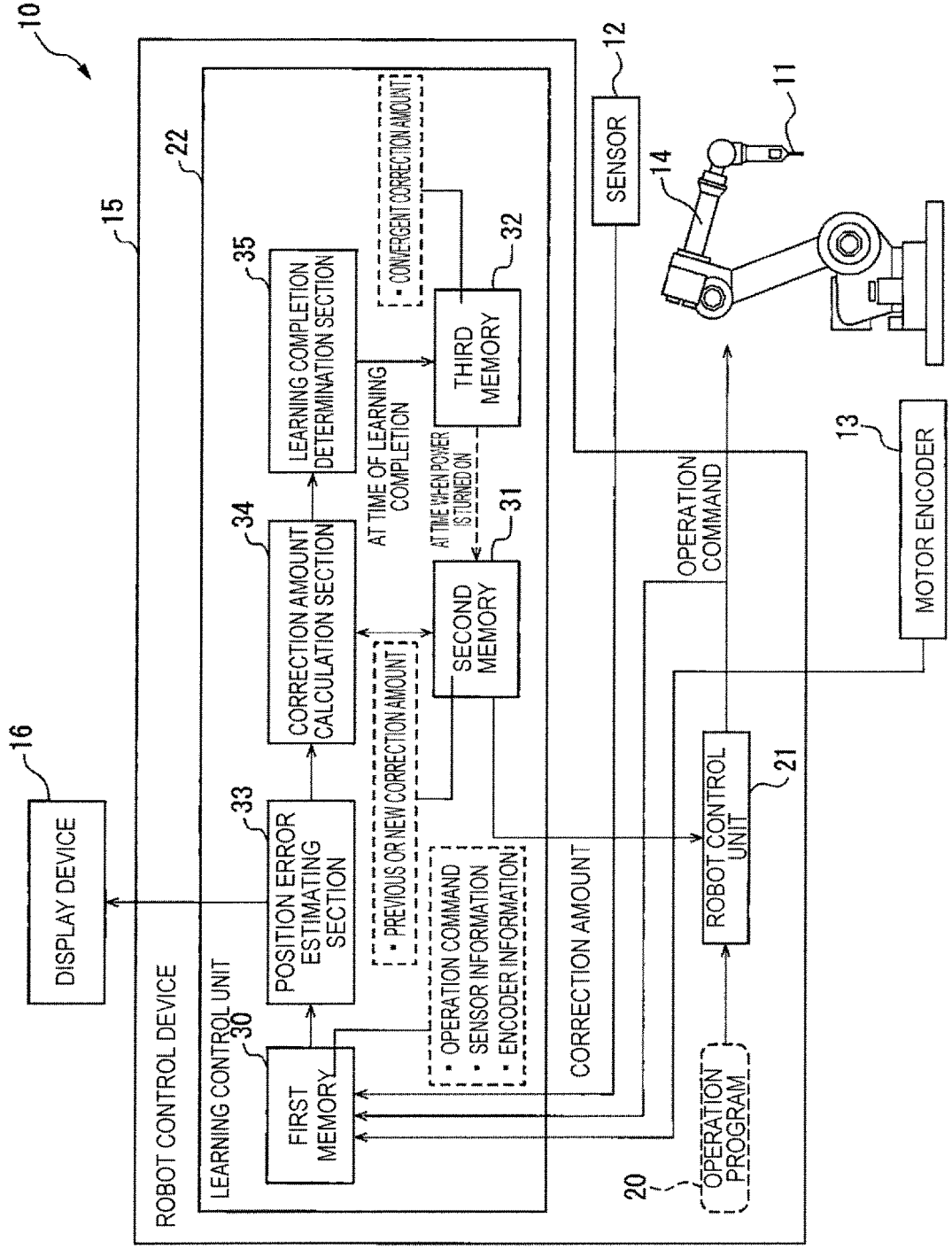
FIG. 3 is a block diagram of a robot control device according to the one embodiment.

FIG. 3 is a block diagram of the robot control device 15 according to the present embodiment. The robot control device 15 includes: a robot control unit 21 which controls an operation of the robot mechanism unit 14 in accordance with an operation program 20; and a learning control unit 22 which causes the robot mechanism unit 14 to operate in accordance with an operation command related to a target position of the control target 11 to estimate a position error between the estimated position of the control target 11 and the target position and perform learning for newly calculating a new correction amount, based on the estimated position error and a correction amount calculated previously to bring the estimated position of the control target 11 closer to the target position.

Each of the robot control unit 21 and the learning control unit 22 includes a publicly known CPU, ASIC, FPGA, and the like. In another embodiment, the learning control unit 22 may be provided, instead of being provided in the robot control device 15, in a computer device communicably connected to the robot control device 15 with wire or wirelessly. Moreover, learning in the learning control unit 22 may be performed offline instead of being performed online.

The learning control unit 22 includes: a first memory 30 which stores sensor information acquired from the sensor 12, encoder information acquired from the motor encoder 13, and an operation command; a second memory 31 which stores a correction amount calculated previously or newly to bring the estimated position of the control target 11 closer to the target position; and a third memory 32 which stores a convergent correction amount obtained through repetitive learning. To enable high-speed learning, the first memory 30 and the second memory 31 are preferably volatile memories; and the third memory 32 is preferably a nonvolatile memory which stores a correction amount even after power has been cut off. After the power is turned on, the convergent correction amount is read out from the third memory 32 into the second memory 31 to be thereby reused by the robot control unit 21.

The learning control unit 22 further includes a position error estimating section 33 which estimates a position error between an estimated position of the control target 11 and the target position, based on the sensor information, the encoder information, and the operation command. The position error estimating section 33 estimates high-frequency components in the position error from the sensor information and also to estimate low-frequency components in the position error from the encoder information. The low-frequency components in the position error estimated based on the motor encoder 13 do not include any estimation error based on the sensor 12, and thus the low-frequency components in the position error need not be removed by using a high-pass filter as in the above-described related art. The position error to be obtained finally in the position error estimating section 33 is a position error from which the estimation error in terms of the low-frequency components based on the sensor 12 has been removed. Hence, the learning control unit 22 can perform learning control for vibrations in the control target 11 accurately.

The learning control unit 22 further includes a correction amount calculation section 34 which newly calculates a new correction amount, based on the position error estimated by the position error estimating section 33 and a previously calculated correction amount stored in the second memory 31. The correction amount newly calculated by the correction amount calculation section 34 is stored in the second memory 31.

The learning control unit 22 further includes a learning completion determination section 35 which determines whether or not learning is completed. The learning completion determination section 35 determines that learning is completed in a case that the ratio between the previously calculated correction amount and the newly calculated correction amount falls within an allowable range, a case that the number of times of learning exceeds a predetermined number of times, or a case that an estimated position error is equal to or lower than an allowable value. In a case that the learning completion determination section 35 determines that learning is completed, a convergent correction amount is stored in the third memory 32.

The robot control unit 21 corrects the operation command by using the correction amount newly calculated by the learning control unit 22 (including the convergent correction amount) and controls the operation of the robot mechanism unit 14.

Figure 4:
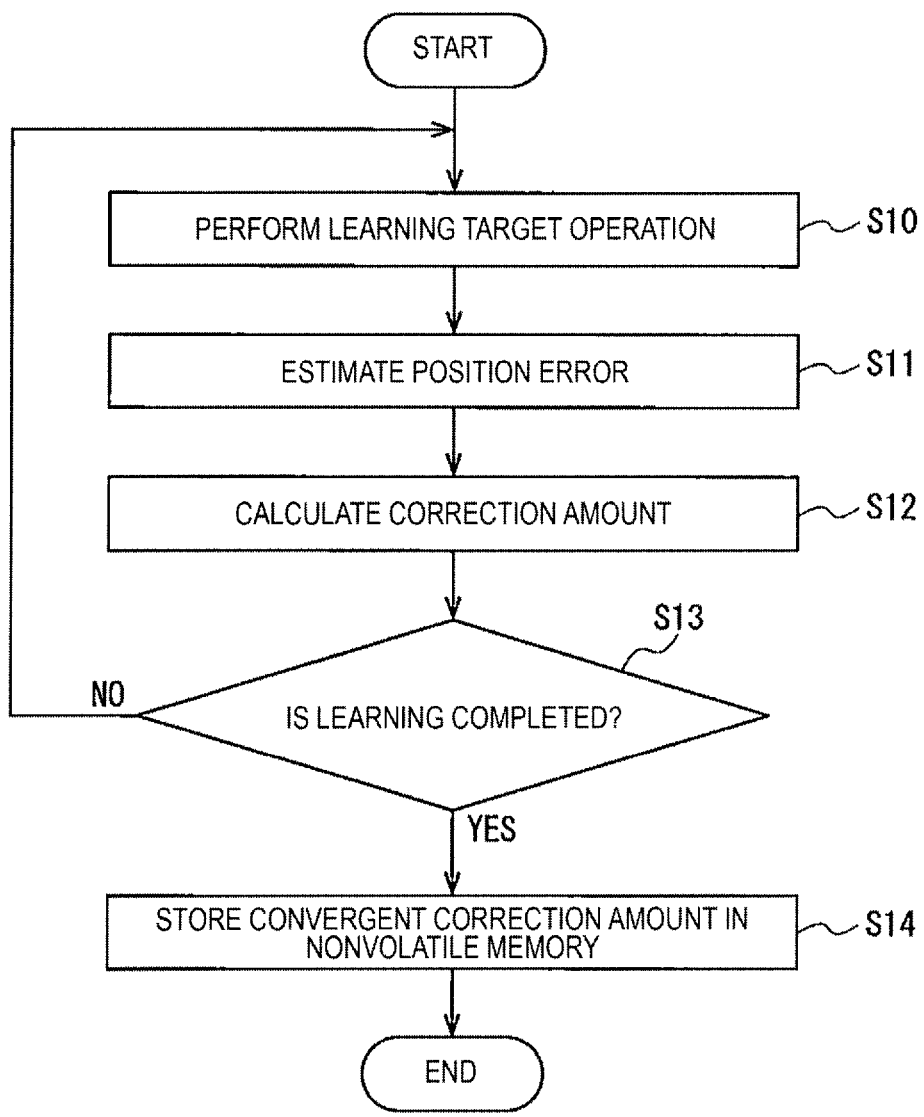
FIG. 4 is a flowchart illustrating a flow of learning control for a robot system according to the one embodiment.

FIG. 4 is a flowchart illustrating a flow of learning control for the robot system 10 according to the present embodiment. This flowchart may be implemented by a program executed by a CPU.

In Step S10, a learning target operation is performed.

In Step S11, high-frequency components in a position error are estimated from sensor information, and low-frequency components in the position error are also estimated from encoder information, to thereby estimate a position error of the control target 11.

In Step S12, based on the estimated position error and a correction amount calculated previously so as to bring the estimated position of the control target 11 closer to a target position, a new correction amount is newly calculated.

In Step S13, whether or not the learning is completed is determined. Specifically, determination is made on whether or not the ratio between the previously calculated correction amount and the newly calculated correction amount falls within the allowable range, whether or not the number of times of learning exceeds the predetermined number of times, or whether or not the estimated position error is equal to or lower than the allowable value. In a case that the learning is not completed (NO in Step S13), the learning control returns to Step S10, and the learning target operation is performed again. In a case that the learning is completed (YES in Step S13), the learning control advances to Step S14.

In Step S14, the convergent correction amount is stored in the nonvolatile memory.

Figure 5:
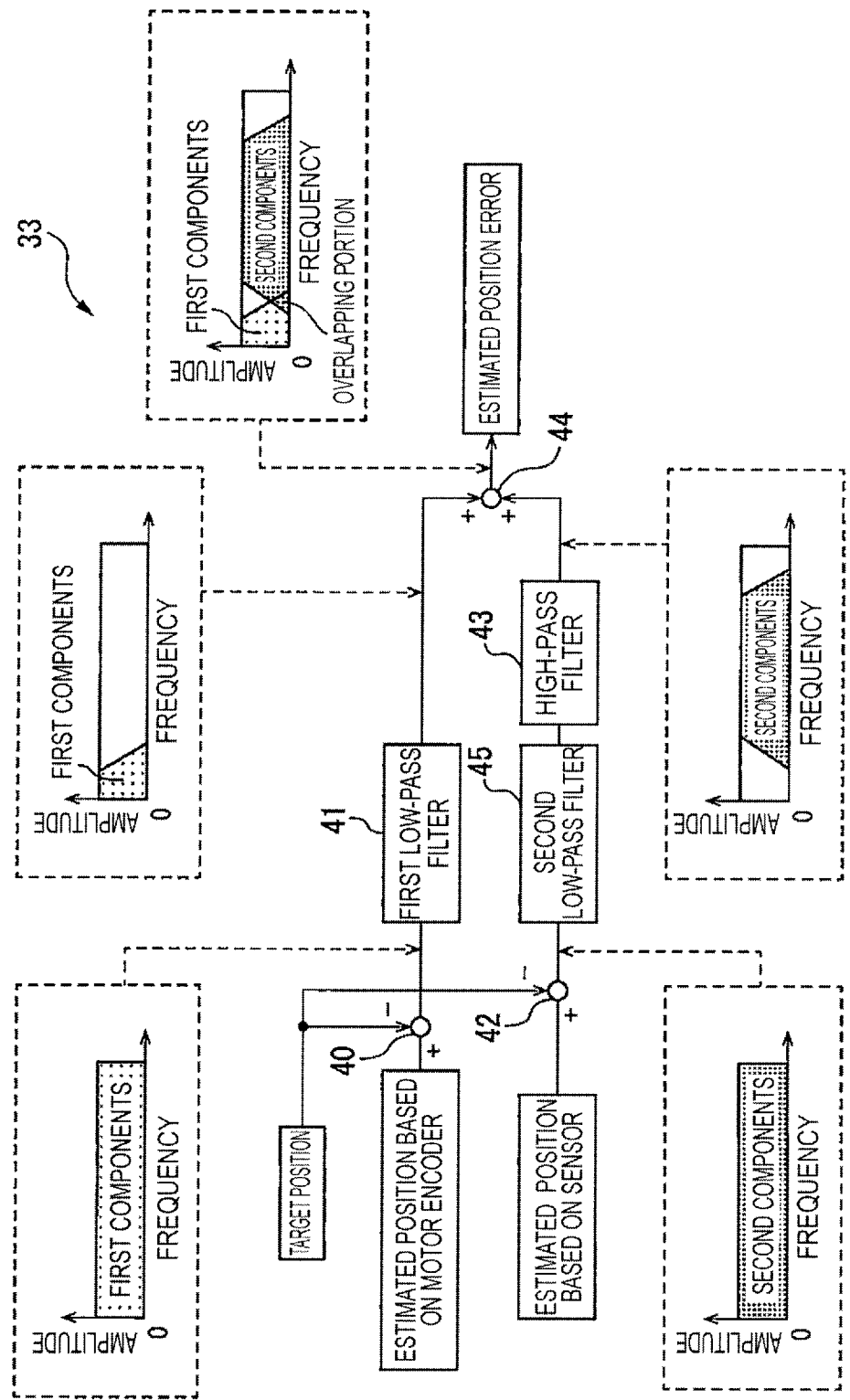
FIG. 5 is a block diagram of a position error estimating section according to a first embodiment.

FIG. 5 is a block diagram of the position error estimating section 33 according to a first embodiment. It should be noted that, to facilitate understanding, FIG. 5 includes illustrations indicating a concept of frequency components in each of processes. The position error estimating section 33 includes: a first subtracter 40 which subtracts a target position from an estimated position based on the motor encoder 13 to thereby obtain first components; a first low-pass filter 41 which obtains low-frequency components of the first components; a second subtracter 42 which subtracts the target position from the estimated position based on the sensor 12 to obtain second components; a high-pass filter 43 which obtains high-frequency components of the second components; and an adder 44 which adds the low-frequency components of the first components and the high-frequency components of the second components.

The position error estimating section 33 may further include, although not an essential constituent element, a second low-pass filter 45 which removes noise or high-frequency components difficult to control. Here, the relationship of the respective cutoff frequencies L1, H1, and L2 of the first low-pass filter 41, the high-pass filter 43, and the second low-pass filter 45 is L1<H1<L2.

With this configuration, the position error estimating section 33 adds the low-frequency components of the first components obtained by subtracting the target position from the estimated position based on the motor encoder 13 and the high-frequency components of the second components obtained by subtracting the target position from the estimated position based on the sensor 12, to thereby estimate a position error. Hence, the position error obtained finally by the position error estimating section 33 is a position error from which the estimation error of the low-frequency components based on the sensor 12 has been removed. Hence, the learning control unit 22 can perform learning control for vibrations in the control target 11 accurately.

However, in a case that the cutoff frequency L1 of the first low-pass filter 41 and the cutoff frequency H1 of the high-pass filter 43 are the same value, for example, 2 Hz, the first low-pass filter 41 and the high-pass filter 43 fail to completely remove frequency components that are equal to and higher than 2 Hz and frequency components that are equal to or lower than 2 Hz, respectively. Hence, the position error obtained finally includes an overlapping portion around 2 Hz as illustrated in FIG. 5, which causes the position error to be estimated excessively large. A position error estimating section 33 according to a second embodiment further solves this problem.

Figure 6:
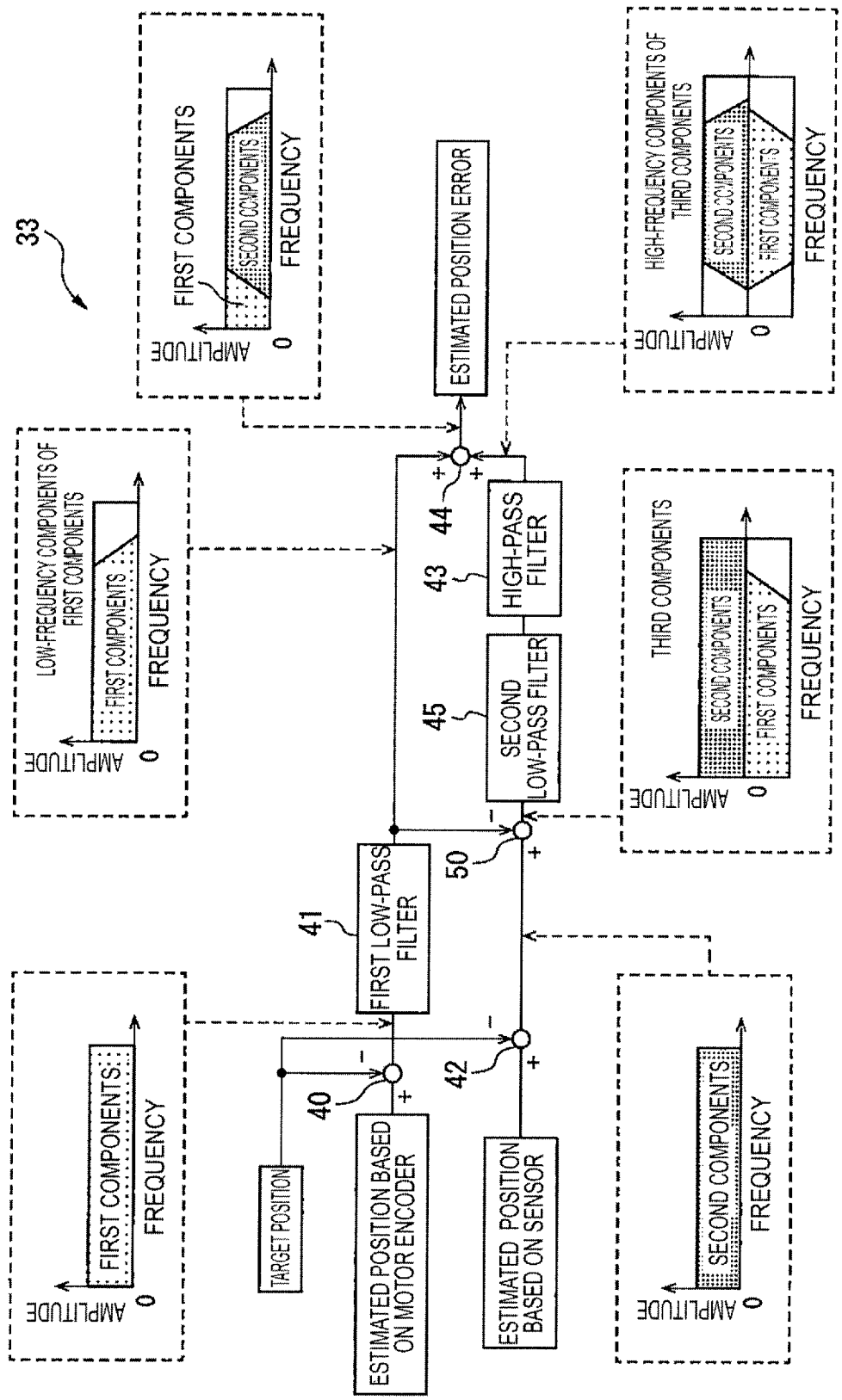
FIG. 6 is a block diagram of a position error estimating section according to a second embodiment.

FIG. 6 is a block diagram of the position error estimating section 33 according to the second embodiment. It should be noted that, to facilitate understanding, FIG. 6 includes illustrations indicating a concept of frequency components in each of processes. The position error estimating section 33 includes: a first subtracter 40 which subtracts a target position from an estimated position based on the motor encoder 13 to thereby obtain first components; a second subtracter 42 which subtracts the target position from the estimated position based on the sensor 12 to obtain second components; a third subtracter 50 which subtracts the first components from the second components to obtain third components; a high-pass filter 43 which obtains high-frequency components of the third components; and an adder 44 which adds the first components to the high-frequency components of the third components.

The position error estimating section 33 may further include, although not essential constituent elements, a first low-pass filter 41 which obtains low-frequency components of the first components and a second low-pass filter 45 which removes noise or high-frequency components difficult to control. In other words, the position error estimating section 33 according to the second embodiment may have a configuration of including the third subtracter 50 in addition to the constituent elements of the position error estimating section 33 according to the first embodiment. Here, the relationship of the respective cutoff frequencies L1, H1, and L2 of the first low-pass filter 41, the high-pass filter 43, and the second low-pass filter 45 is H1<L1≤L2.

With this configuration, the position error estimating section 33 adds the low-frequency components of the first components and the high-frequency components of the third components obtained by subtracting the low-frequency components of the first components from the second components, to thereby estimate a position error. Specifically, the position error estimating section 33 applies the high-pass filter 43 to the second components and the first components with a minus sign together and further adds the first components with a plus sign to the obtained high-frequency components of the third components, to thereby suitably adjust the boundary between the high-frequency components of the second components and the low-frequency components of the first components in the position error obtained finally. In this way, the problem that a position error is estimated excessively large is solved.

Figure 7:
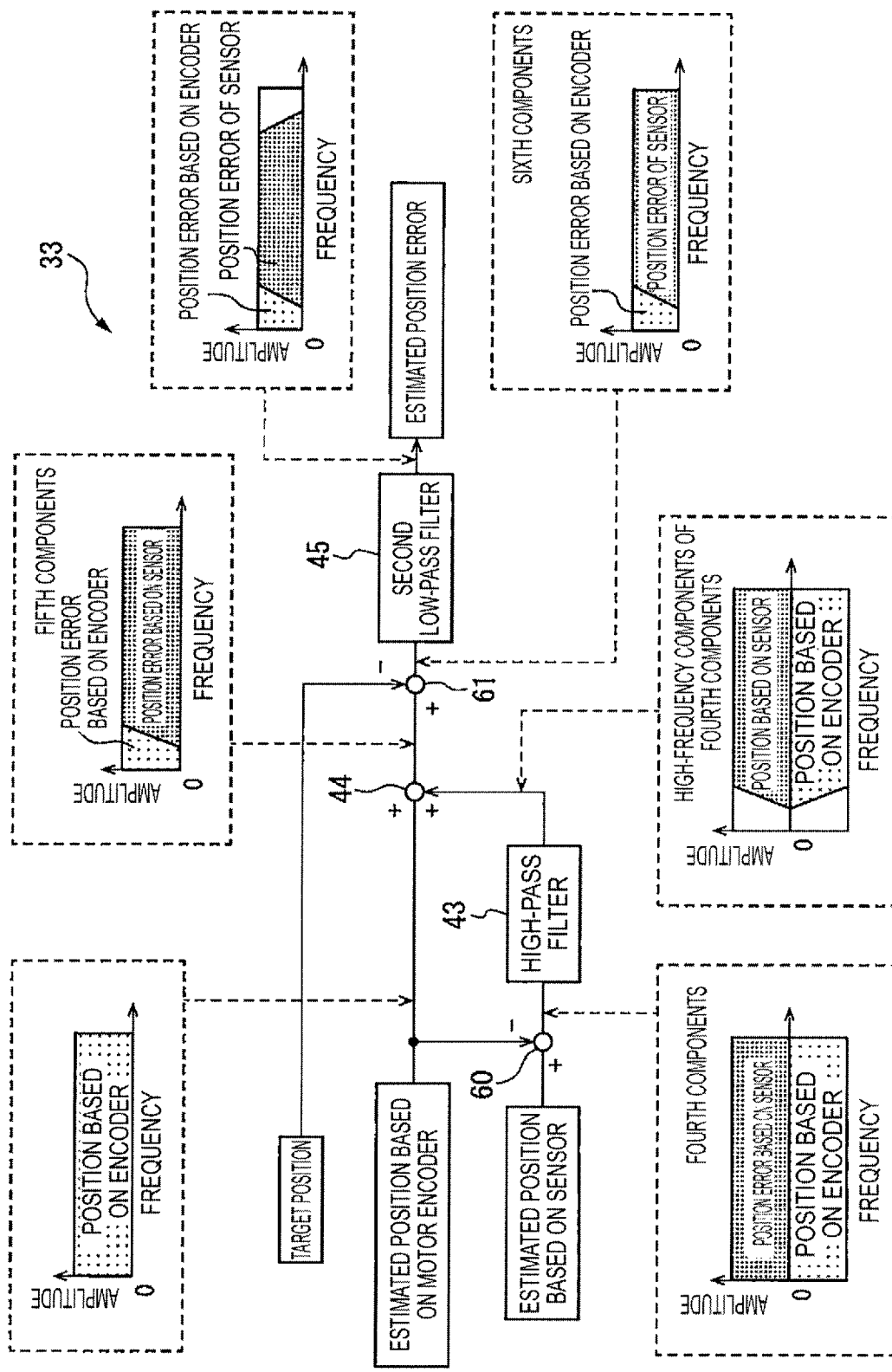
FIG. 7 is a block diagram of a position error estimating section according to a third embodiment.

FIG. 7 is a block diagram of a position error estimating section 33 according to a third embodiment. It should be noted that, to facilitate understanding, FIG. 7 includes illustrations indicating a concept of frequency components in each of processes. The position error estimating section 33 includes: a fourth subtracter 60 which subtracts an estimated position based on the motor encoder 13 from an estimated position based on the sensor 12 to thereby obtain fourth components; a high-pass filter 43 which obtains high-frequency components of the fourth components; an adder 44 which adds the estimated position based on the motor encoder 13 to the high-frequency components of the fourth components to obtain fifth components; and a fifth subtracter 61 which subtracts a target position from the fifth components to obtain sixth components.

The position error estimating section 33 may further include, although not an essential constituent element, a second low-pass filter 45 which removes noise or high-frequency components difficult to control. Here, the relationship of the respective cutoff frequencies H1 and L2 of the high-pass filter 43 and the second low-pass filter 45 is H1<L2.

With this configuration, the position error estimating section 33 adds the high-frequency components of the fourth components obtained by subtracting the estimated position based on the motor encoder 13 from the estimated position based on sensor 12 and the estimated position based on the motor encoder 13 and further subtracts the target position from the fifth components obtained as a result of the addition, to thereby estimate a position error. Specifically, the position error estimating section 33 applies the high-pass filter 43 to the estimated position based on the sensor 12 and the estimated position with a minus sign based on the motor encoder 13 and further adds the estimated position with a plus sign based on the motor encoder 13 to the obtained high-frequency components of the fourth components, to thereby suitably adjust the boundary between the high-frequency components of the position error based on the sensor 12 and the low-frequency components of the position error based on the motor encoder 13 in the position error obtained finally. In this way, the problem that a position error is estimated excessively large is solved.

The position error estimating section 33 further reduces constituent elements by eliminating the first low-pass filter 41 and also integrating, into one, the first subtracter 40 and the second subtracter 42 that subtract the target position, and hence enables high-speed learning.

The above-described position error estimated by both the sensor 12 and the motor encoder 13 is more accurate than the position error estimated only by the motor encoder 13. However, in an operation with a small effect of backlash and an operation with a small deformation of the robot mechanism unit 14, there is no big difference in accuracy between the position error estimated only by the motor encoder 13 and the position error estimated by both the sensor 12 and the motor encoder 13. In view of this, the learning control unit 22 further determines whether or not learning is possible only by the motor encoder 13.

Figure 8A:
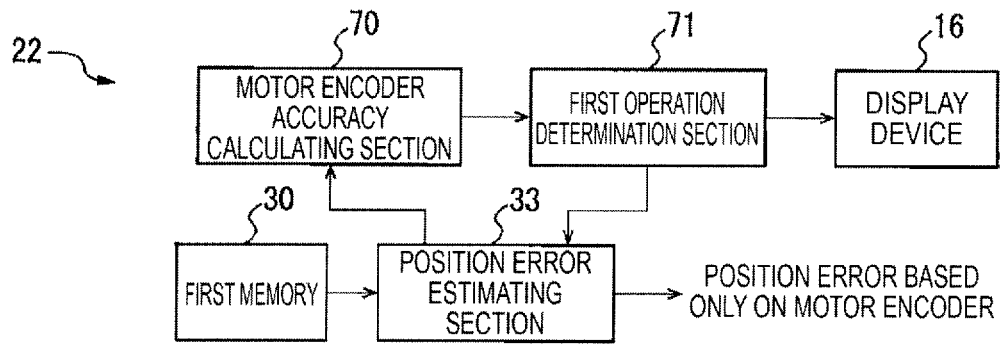
FIG. 8A is a block diagram of a learning control unit which determines whether or not learning is possible only by a motor encoder.

FIG. 8A is a block diagram of the learning control unit 22 which determines whether or not learning is possible only by the motor encoder 13. It should be noted that, to facilitate understanding, FIG. 8A illustrates only the constituent elements necessary for the description. The learning control unit 22 further includes: a motor encoder accuracy calculation section 70 which calculates accuracy of the motor encoder 13, based on a position error estimated by the position error estimating section 33; and a first operation determination section 71 which determines, in a case that the calculated accuracy is within an allowable range, whether or not a learning target operation is similar to an operation having the accuracy within the allowable range, and performs learning, based on a result of determination only by the motor encoder 13 without using the sensor 12.

The motor encoder accuracy calculation section 70 subtracts a position error estimated by both the sensor 12 and the motor encoder 13 from the position error estimated only by the motor encoder 13, to thereby calculate accuracy of the motor encoder 13.

The first operation determination section 71 determines whether or not the learning target operation is similar to the operation having the accuracy within the allowable range, based on a predetermined threshold value regarding a start position, an end position, operating speed, acceleration, motor load, or the like. In a case that the learning target operation is similar to the operation having the accuracy within the allowable range, the first operation determination section 71 causes a display device 16 to display that learning is possible only by the motor encoder 13 without using the sensor 12. The display device 16 may further display the locus of position errors estimated through respective times of learning during or after the end of learning as well as a minimum value and a maximum value of the position errors.

With this configuration, the learning control unit 22 is able to determine whether or not learning of an unknown learning target operation is possible only by the motor encoder 13. Hence, even in a case that, after the sensor 12 is detached from the robot mechanism unit 14 upon end of learning, a necessity to perform learning again arises for another operation, learning only by the motor encoder 13 is determined to be possible as long as the learning target operation is in the allowance. Consequently, the man-hours for attaching the sensor 12 can be reduced.

Figure 8B:
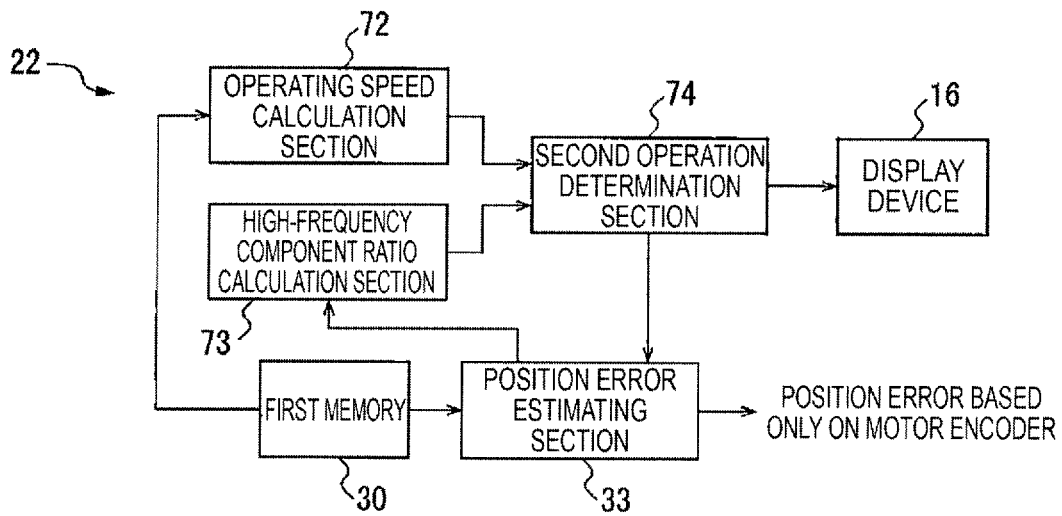
FIG. 8B is a block diagram of another learning control unit which determines whether or not learning is possible only by the motor encoder.

FIG. 8B is a block diagram of another learning control unit 22 which determines whether or not learning is possible only by the motor encoder 13. It should be noted that, to facilitate understanding, FIG. 8B illustrates only the constituent elements necessary for the description. The learning control unit 22 further includes: an operating speed calculation section 72 which calculates operating speed in the learning target operation; a high-frequency component ratio calculation section 73 which calculates the ratio of high-frequency components in a position error in the learning target operation; and a second operation determination section 74 which determines whether or not the calculated operating speed is lower than a predetermined threshold value and the calculated ratio of the high-frequency components is smaller than a predetermined threshold value, and performs learning, based on a result of the determination, only by the motor encoder 13 without using the sensor 12.

In a case that the calculated operating speed is lower than the predetermined threshold value and the calculated ratio of the high-frequency components is smaller than the predetermined threshold value, the second operation determination section 74 causes the display device 16 to display that learning is possible only by the motor encoder 13 without using the sensor 12. The display device 16 may further display the locus of position errors estimated through respective times of learning during or after the end of learning as well as a minimum value and a maximum value of the position errors.

With this, the learning control unit 22 is able to determine whether or not learning of an unknown learning target operation is possible only by the motor encoder 13. Hence, even in a case that, after the sensor 12 is detached from the robot mechanism unit 14 upon end of learning, a necessity to perform learning again arises for another operation, learning only by the motor encoder 13 is determined to be possible as long as the learning target operation is in the allowance. Consequently, the man-hours for attaching the sensor 12 can be reduced.

Figure 9:
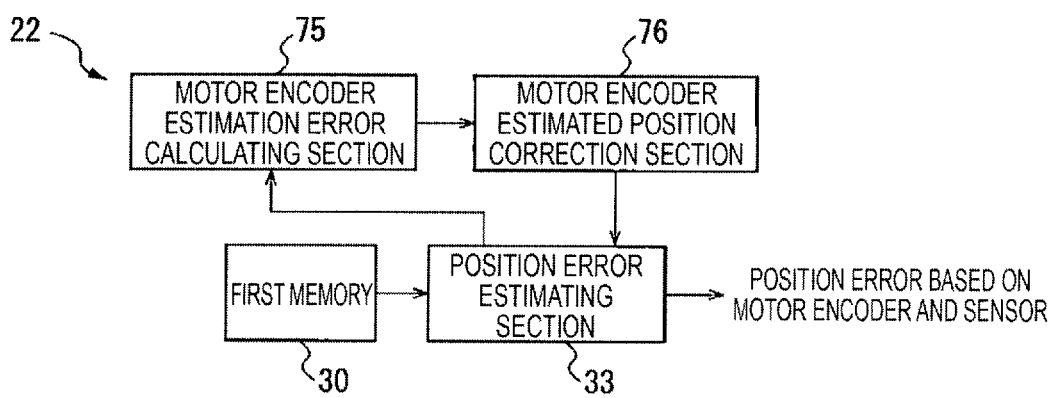
FIG. 9 is a block diagram of a learning control unit which corrects an estimated position based on a motor encoder.
Figure 10A:
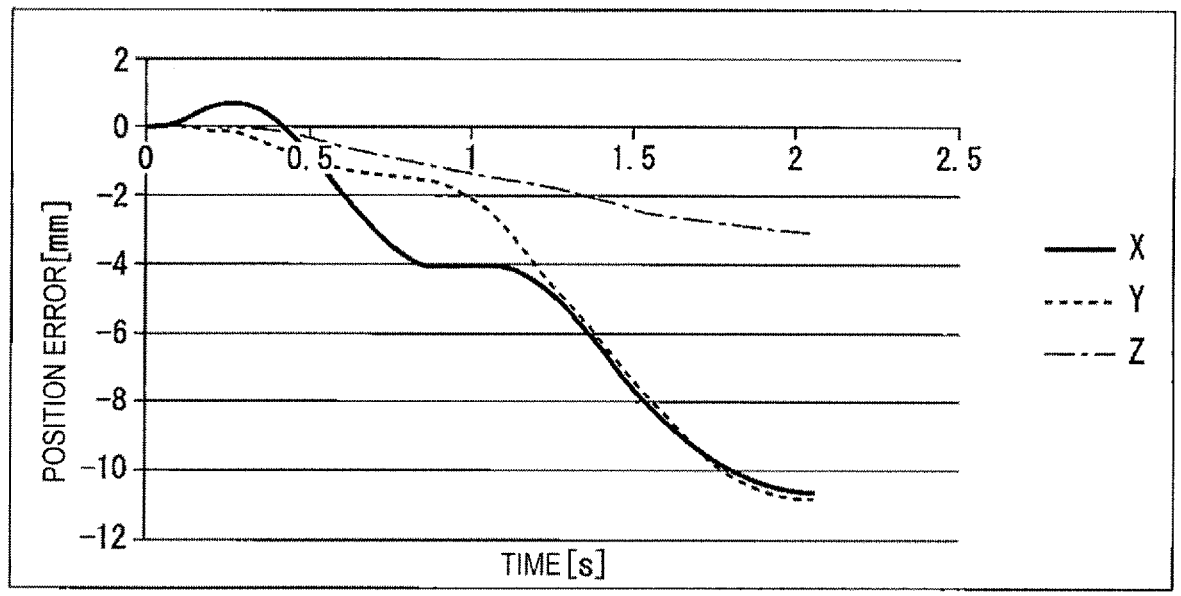
FIG. 10A is a graph illustrating a relationship between a position error between an estimated position based on a sensor and a target position, and time.
Figure 10B:
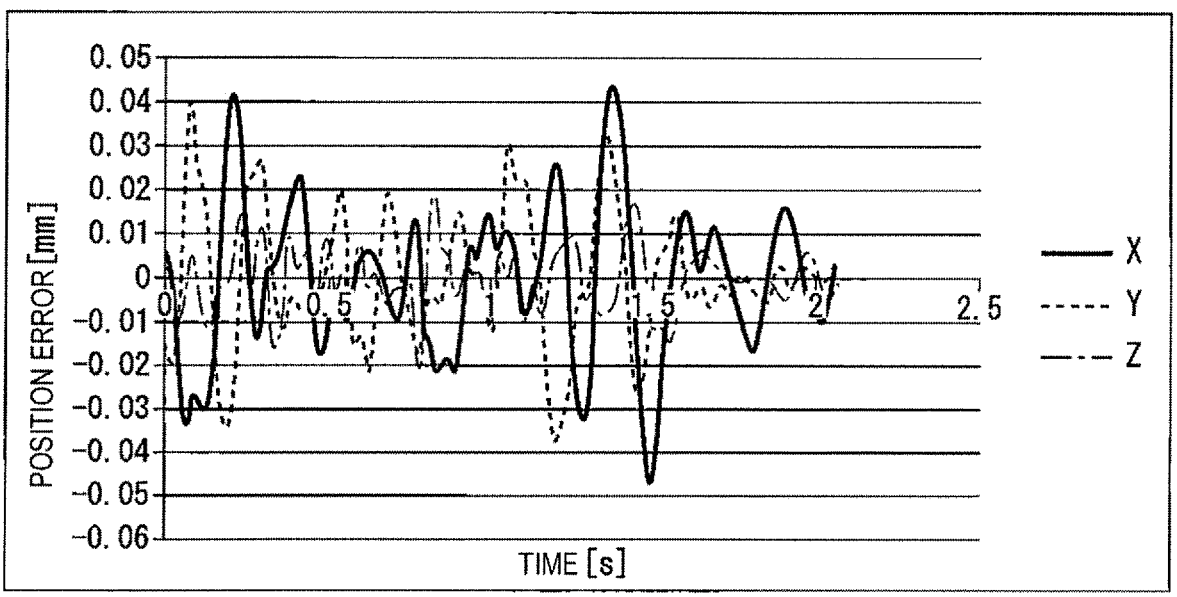
FIG. 10B is a diagram obtained by removing low-frequency components from the graph illustrated in FIG. 10A by applying a high-pass filter.

FIG. 9 is a block diagram of the learning control unit 22 which corrects an estimated position based on the motor encoder 13. The estimated position based on the motor encoder 13 is estimated in consideration of deformation of the robot mechanism unit 14, effects of backlash, and the like to some extent but still includes an estimation error attributable to an individual difference among robots and effects of a tool attached to an arm tip. To address this, the learning control unit 22 further includes: a motor encoder estimation error calculation section 75 which calculates an estimation error based on the motor encoder 13; and a motor encoder estimated position correcting section 76 which corrects the estimated position based on the motor encoder 13, based on the calculated estimation error.

The motor encoder estimation error calculation section 75 subtracts a position error estimated by both the motor encoder 13 and the sensor 12 from a position error estimated only by the motor encoder 13, to thereby calculate an estimation error based on the motor encoder 13 including an estimation error attributable to backlash, an estimation error due to deformation of an arm and a tool, and the like.

The motor encoder estimated position correcting section 76 subtracts the calculated estimation error from the estimated position based on the motor encoder 13 to thereby correct the estimated position based on the motor encoder 13.

With this configuration, the estimated position based on the motor encoder 13 reduces the estimation error based on the motor encoder 13, such as an estimation error attributable from backlash and an estimation error due to deformation of an arm and a tool, and hence the learning control unit 22 can perform learning control for vibrations in the control target 11 accurately.

According to the present embodiment, low-frequency components in a position error are estimated from information from the motor encoder 13, and high-frequency components in the position error are estimated from information from the sensor 12, and hence a position error obtained finally is a position error from which an estimation error of low-frequency components based on the sensor 12 has been removed. Hence, accurate learning control for vibrations in the control target 11 is enabled.

A program for executing the above-described flowchart may be provided having been recorded in a computer-readable non-transitory recording medium, for example, a CD-ROM or the like.

While various embodiments have been described herein, the present invention is not intended to be limited to the above-described embodiments, and it is to be understood that various changes may be made thereto within the scope of the following claims.

The invention claimed is:

1. A robot system comprising a robot mechanism unit provided with a sensor and a motor encoder for detecting a position of a control target, and a robot control device which controls an operation of the robot mechanism unit in accordance with an operation program, the robot system comprising:
    a learning control unit which causes the robot mechanism unit to operate in accordance with an operation command related to a target position of the control target to estimate a position error between an estimated position of the control target and the target position and perform learning by newly calculating a new correction amount, based on the estimated position error and a correction amount calculated previously to bring the estimated position of the control target closer to the target position; and
    a robot control unit which corrects the operation command by using the newly calculated correction amount, to control the operation of the robot mechanism unit,
    wherein the learning control unit comprises a position error estimating section which estimates a low-frequency component in the position error, based on information from the motor encoder, and estimates a high-frequency component in the position error, based on information from the sensor.

2. The robot system of claim 1, wherein the position error estimating section adds a low-frequency component of a first component obtained by subtracting the target position from an estimated position based on the motor encoder and a high-frequency component of a second component obtained by subtracting the target position from an estimated position based on the sensor, to thereby estimate the position error.

3. The robot system of claim 1, wherein the position error estimating section adds a first component obtained by subtracting the target position from an estimated position based on the motor encoder and a high-frequency component of a third component obtained by subtracting the first component from a second component obtained by subtracting the target position from an estimated position based on the sensor, to thereby estimate the position error.

4. The robot system of claim 1, wherein the position error estimating section adds a high-frequency component of a fourth component obtained by subtracting an estimated position based on the motor encoder from an estimated position based on the sensor and an estimated position based on the motor encoder and further subtract the target position from a fifth component obtained as a result of the addition, to thereby estimate the position error.

5. The robot system of claim 1, wherein the position error estimating section removes noise or a high-frequency component difficult to control.

6. The robot system of claim 1,
    wherein the learning control unit further comprises a motor encoder accuracy calculation section which calculates accuracy of the motor encoder, based on the position error estimated in the position error estimating section; and a first operation determination section which determines, in a case that the calculated accuracy is within an allowable range, whether or not a learning target operation is similar to an operation having an accuracy within the allowable range, and
    wherein the learning control unit performs the learning, based on a result of determination only by the motor encoder without using the sensor.

7. The robot system of claim 1,
    wherein the learning control unit further comprises an operating speed calculation section which calculates operating speed of a learning target operation; a high-frequency component ratio calculation section which calculates a ratio of high-frequency component in the position error in the learning target operation; and a second operation determination section which determines whether or not the calculated operating speed is lower than a predetermined threshold value and the calculated ratio of the high-frequency component is smaller than a predetermined threshold value, and
    wherein the learning control unit performs the learning, based on a result of determination only by the motor encoder without using the sensor.

8. The robot system of claim 1, wherein the learning control unit further comprises a motor encoder estimation error calculation section which calculates an estimation error based on the motor encoder and a motor encoder estimated position correcting section which corrects the estimated position based on the motor encoder, based on the calculated estimation error.

9. The robot system of claim 1, further comprising a display device which displays that learning is possible only by the motor encoder without using the sensor.

10. The robot system of claim 1, wherein the learning control unit further comprises a learning completion determination section which determines that the learning is completed, in a case that a ratio between the previously calculated correction amount and the newly calculated correction amount falls within an allowable range, a case that the number of times of learning exceeds a predetermined number of times, or a case that the estimated position error is equal to or lower than an allowable value.

11. The robot system of claim 9, wherein the display device displays a trajectory of position errors estimated through respective times of learning during learning or after an end of learning as well as a minimum value and a maximum value of the position errors.

12. The robot system of claim 1, wherein the sensor includes an acceleration sensor, a gyro sensor, an inertial sensor, or a strain gauge.

13. The robot system of claim 1, wherein the learning control unit is provided in the robot control device or a computer device connecting to the robot control device with wire or wirelessly.

* * * * *